United States Patent [19]

Gazzarrini

[11] Patent Number: 4,887,858
[45] Date of Patent: Dec. 19, 1989

[54] DEVICE WITH ADHESIVE FOR THE HOLDING OF THIN TEXTILE ARTICLES

[75] Inventor: Vinicio Gazzarrini, Florence, Italy

[73] Assignee: Solis S.R.L., Florence, Italy

[21] Appl. No.: 144,401

[22] Filed: Jan. 15, 1988

[30] Foreign Application Priority Data

Oct. 14, 1987 [IT] Italy .................... 9509 A/87

[51] Int. Cl.$^4$ .......................... B65H 3/08; B65H 3/20
[52] U.S. Cl. .................................. 294/1.1; 414/796.9;
414/795.5; 271/33; 271/104; 15/104 A
[58] Field of Search ................. 294/1.1; 414/116, 117;
15/104 A; 271/5, 11, 33, 91, 97, 104; 19/9;
401/208, 218, 219, 220

[56] References Cited

U.S. PATENT DOCUMENTS

| | | | |
|---|---|---|---|
| 2,351,367 | 6/1944 | Rider | 15/104 A |
| 2,866,992 | 1/1959 | Toulmin | 401/208 |
| 3,785,638 | 1/1974 | Beazley | 271/97 X |
| 4,083,075 | 4/1978 | Hester | 294/1.1 X |
| 4,627,758 | 12/1986 | Winthrop | 401/218 X |
| 4,640,539 | 2/1987 | La Porte | 294/1.1 X |

FOREIGN PATENT DOCUMENTS

2277754 2/1976 France ..................... 271/97

Primary Examiner—Dennis H. Pedder
Assistant Examiner—Dean J. Kramer
Attorney, Agent, or Firm—McGlew & Tuttle

[57] ABSTRACT

In order to individually pick up and temporarily hold hosiery permeable articles, especially tubular articles like panty-hoses and stockings, and instantaneously stretch apart their elastic edges their automatic transfer, a holding device with adhesive and an air jet is utilized. The device includes a tape motorized to advance with intermittence between two elements provided for driving and tensioning the tape, and with a block for the support of the holding zone of the tape and an underlying support for more articles in overlapping relationship to form a stack.

Nozzles for supplying jets for compressed air are located adjacent and perpendicularly oriented to the holding zone of the article, and in such a way as to act in a direction opposite to that of the retention force of the adhesive tape, thereby to pass through the article stretching out the elastic edge of the article as soon as this has moved away from the relevant support.

5 Claims, 3 Drawing Sheets

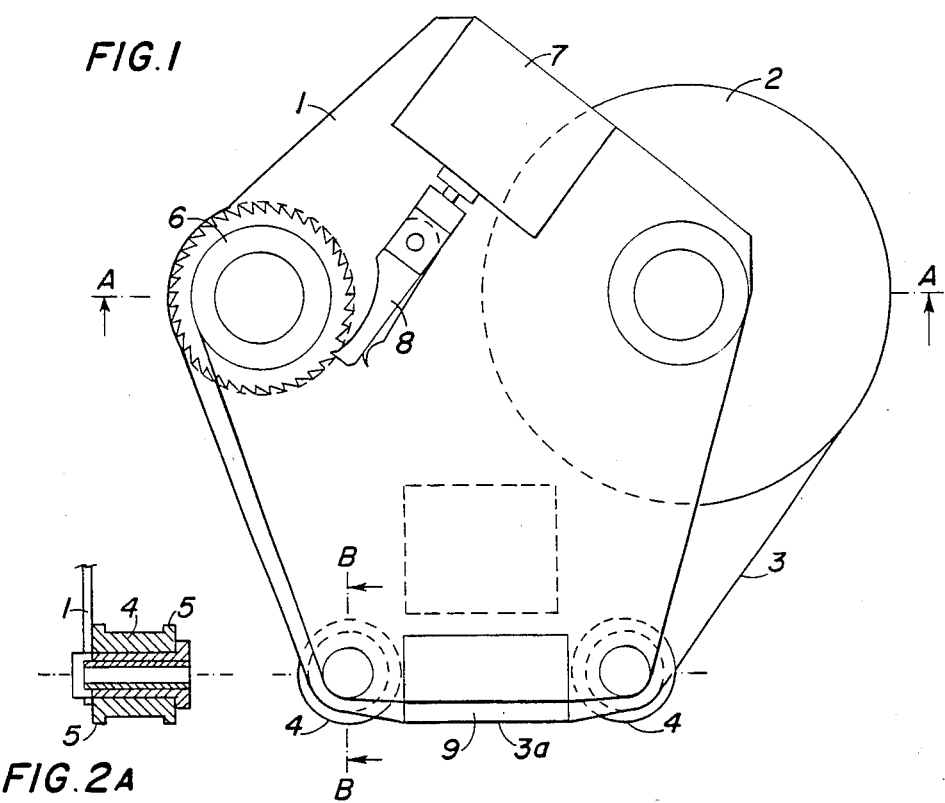
FIG.1
FIG.2A
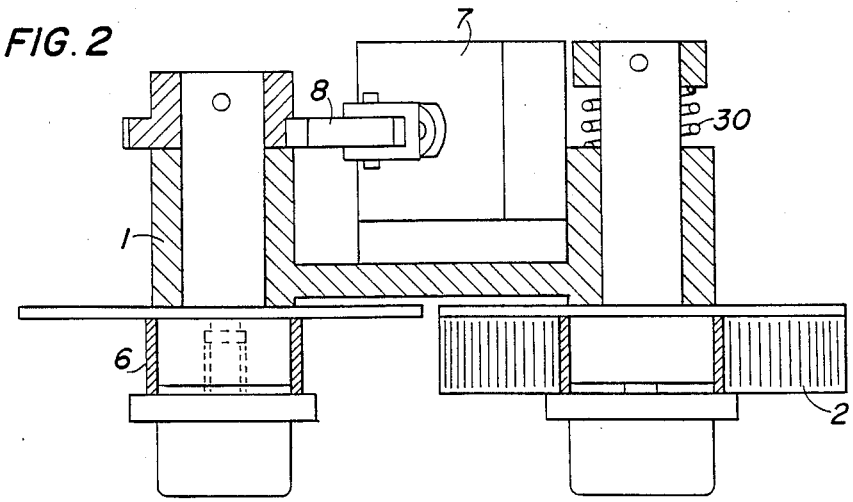
FIG.2

DEVICE WITH ADHESIVE FOR THE HOLDING OF THIN TEXTILE ARTICLES

FIELD AND BACKGROUND OF THE INVENTION

The present invention relates to devices for the holding of textiles articles and, in particular, to textile articles of very thin thickness. The invention is especially useful for the temporary holding of hosiery articles especially panty hose and stockings just prior to their automatic transfer to a new location.

The presently known devices for holding textile or similar materials are incapable, above all, of overcoming the difficulties related to the automatic picking up of pieces made of very light and thin fabric, one at a time, from a stack. In fact, the pneumatic and mechanical systems so far known do not solve this problem in a reliable repeatable way for the following reasons among others: the pneumatic devices fail with airpermeable fabrics as the air passing through them may suck more than one piece at a time, the mechanisms which utilize pins may pierce through the article and thus may likewise hold more than one article at a time. In particular, such devices are not suited for thin, light and flexible fabics as for stockings and panty-hoses.

A similar difficulty encountered with the known devices consists in opening, that is spreading apart a flattened tubular fabric, a basic operation in the treatment of stockings and pantyhoses which poses a problem, when using these devices, equivalent to the one present when picking up a single piece of fabric at a time from a stack.

It is known from the Italian Patent No. 9438-A/86, a device for holding fabrics by means of an adhesive comprising a support structure for a holding element, in the form of a tape, being motorized for advancing discontinuously between two transmission and tension members so that, upon every interruption of said movement, at least the outer surface of the holding element between the two transmission and tension members is provided with suitable adhesive material. Such device, although suitable for individually picking up the articles made of even thin fabric from a stack of like articles, does not allow, if the fabric is for hosiery and the article is tubular like, in particular panty-hoses and stockings, the elastic edge to be instantly stretched out, in view of their automatic transfer, a basic operation in the finish treatment of stockings and panty-hoses.

In fact, even the light pressure of the adhesive tape onto the upper face of the tubular article, which upon its holding is in flat condition, also causes the holding of those burrs of fabric of the lower face of the article that result retained by the stitches of the upper face. This fact, when the holding device and the stack of articles move away, causes the spontaneous stretching out of gravity of the elastic edge of the panty-hose or stocking with such a delay as to result unacceptable in relation to the times of automatic transfer required in the treatment of these products.

SUMMARY AND OBJECTS OF THE INVENTION

The present invention has the object of providing a holding device which eliminates the drawbacks of similar devices presently known, and allows in a reliable and repeatable, the automatic picking up, from one side only, of a textile article from a stack of equal or not, simple or tubular, even very thin pieces.

This object has been achieved in conformity with the present invention by realizing a device for holding textile articles, comprising a support structure for a holding element shaped like a tape or belt being motorized for moving discontinuously between two transmission and tension members, so that, upon each interruption of the movement, at least the outer surface of the holding element between the two transmission and tension members is provided with adhesive material.

According to a preferred embodiment of the holding device according to the invention, the holding element consists of a tape being adhesive on one side only, fed by a coil and rewound, after the transmission elements, over a drum which is driven by a pawl pneumatic system. According to a further preferred embodiment, the holding element is made up of a belt ring-like closed on transmission elements, which belt is put in contact, before the transmission element which is upstream of the holding zone, with a felt supplied with paste from an overhanging tank. Alternatively, the elements which make the belt adhesive may consist of a block or stick glue or a drop device with brush.

Such device is particularly suitable for the holding of articles having very thin thickness.

A further object of the invention is to provide a device for the temporary holding of thin hosiery fabrics, especially tubular, in particular panty-hoses or stockings, which eliminates said drawback and provides, in a reliable and acceptable manner, the instantaneous stretching out of their elastic eddge, immediately after the hold performed by the holding device with adhesive.

This result has been achieved in accordance with the invention by adopting the idea of providing a holding device with adhesive, having a plurality of nozzles for generating as many jets of compressed air in a direction perpendicular to the holding zone of the article and opposite to that of the retention force of the adhesive tape, immediately after every holding operation and during the moving away of the articles support.

According to further characteristics, the holding operation is carried out indifferently either by the vertical upwards displacement of the holding device with adhesive in respect to the underlying stack of articles, or by the verical downwards displacement of the support for the stack of articles in respect to the holding device.

Such device is particularly suitable for individually picking up and temporarily holding the panty-hoses by the upper edge of the bodice and the air jets, soon after the hold, allowing the separation of the lower edge of the bodice with the instantaneous opening of the elastic edge which takes up the best profile allowing the subsequent transfer of the article by means of the elements entering the thus opened bodice.

The various features of novelty which characterize the invention are pointed with particularity in the claims annexed to and forming a part of this disclosure. For a better understanding of the invention its operating advantages and specific objects obtained by its uses, reference is made to the accompanying drawings and descriptive matter in which a preferred embodiment of the invention is illustrated.

BRIEF DESCRIPTION OF THE DRAWINGS

In the Drawings:

FIG. 1 is the front view of the work head of a holding device according to the present invention;

FIG. 2 is the section taken in the direction of the arrows of line A—A of FIG. 1;

FIG. 2A is the section taken in the direction of the arrows of line B—B of FIG. 1;

DESCRIPTION OF THE PREFERRED EMBODIMENTS

Figure 3:
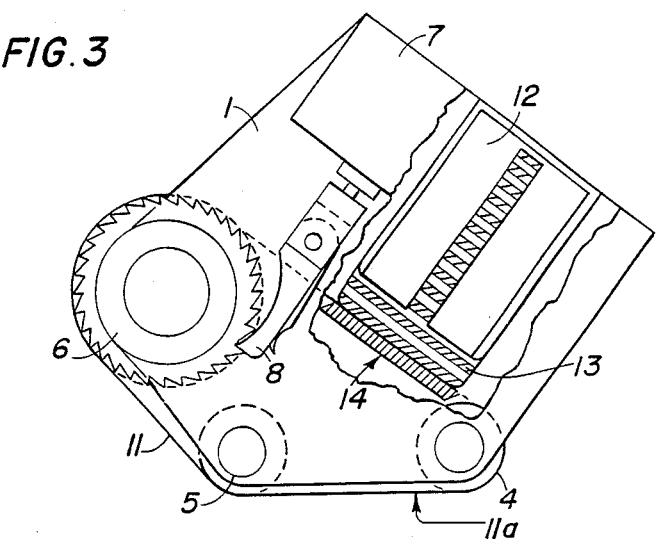
FIG. 3 is a front view, partly sectioned, of a modified embodiment of the holding device according to the invention; nd

Referring to the drawings in particular the invention embodied herein comprises a support structure 1 which houses a taper-like holding element 3, 11, motorized for discontinuously moving between two transmission and tension members 4, 10, so that at least the outer surface 3a, 11a of the holding element between the two transmission and tension members can be provided with adhesive material.

As shown in FIGS. 1 and 2 of the attached drawings, support structure 1 includes elements which are transversely mounted in a pivoting manner in the indicated operative order: a ccoil 2 on which a common tape 3 is wound being adhesive on only one side, two tape guiding rollers 4 in the groove of which the tape is made to pass and not allowed to come out owing to the presence of lateral edges 5 projecting from the periphery of the rollers, and a drum 6 for the rewinding of the used tape, the movement of which is obtained by means of a pneumatic device 7 having a pawl 8. Between the rollers 4, a tape zone 3a is delimited, intended to provide said holding and being moved outwardly by the support structure owing to the thrust of an electric block 9 made of rubber, for example.

After a predetermined number of holding operations, corresponding to the running out of the tape's adhesive material, the pneumatic device is driven to feed tape 3 from the coil 2 to the drum 6 through an extent correspondingly sufficient to renew the tape in the holding zone 3a. In FIG. 2, the coil 2 is shown advantageously frictioned by a spring 10 to ensure the correct tension of the adhesive tape during the holding.

FIG. 3 shows a modified embodiment of the device of FIG. 1, in which the coil and the adhesive tape are replaced by a belt 11 ring-like mounted on the two rollers 4 and the drum 6, the outer surface 11a of this belt being spread with liquid glue. A tank 12, fixedly mounted with its aperture turned downwards behind the roller which is upstream of the holding zone, supplies glue by capillarity to a felt 13 for the closing of the tank and with which the belt is kept in contact through stop element 14. In place of the tank, a block of stick glue or a drop device with brush in contact with the belt may be mounted.

Figure 4:
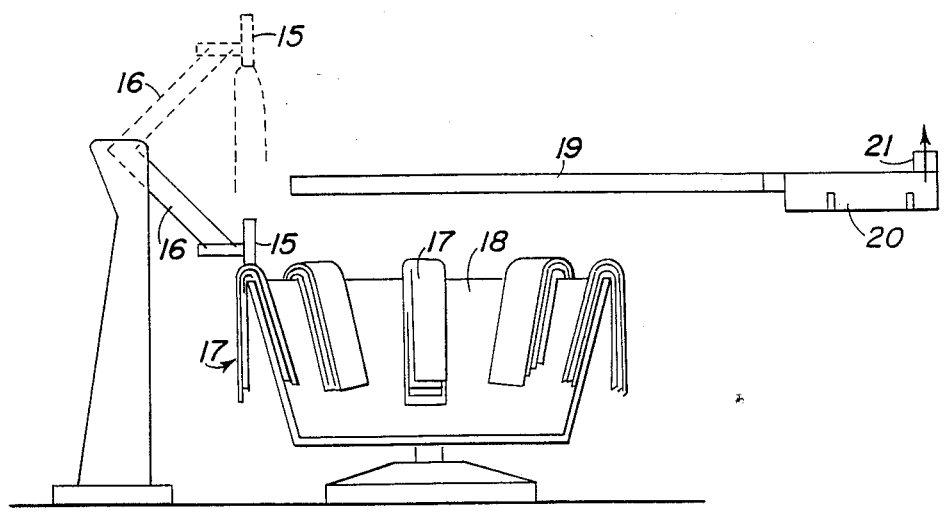
FIG. 4 is an example of utilization of the holding device according to the invention.
Figure 6:
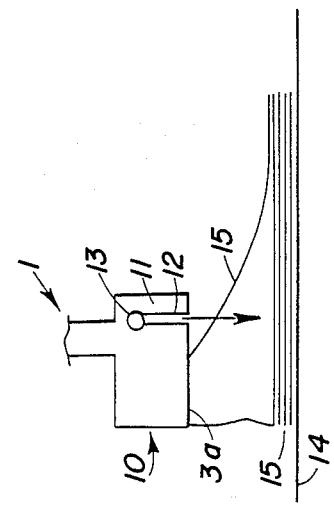

FIG. 4 shows a utilization example of the holding device 15 according to the invention, in combination with means 16 for the displacement and orientation thereof, which allows the holding of pantyhoses 17, one at a time, from a dwelling carousel 18 and, by lifting them, one at a time, allows them to be moved close, for example, to the mouth of a transfer tube 19 connected to a lower discharge tilt valve 20 and pneumatic sucking means 21.

Figure 5:
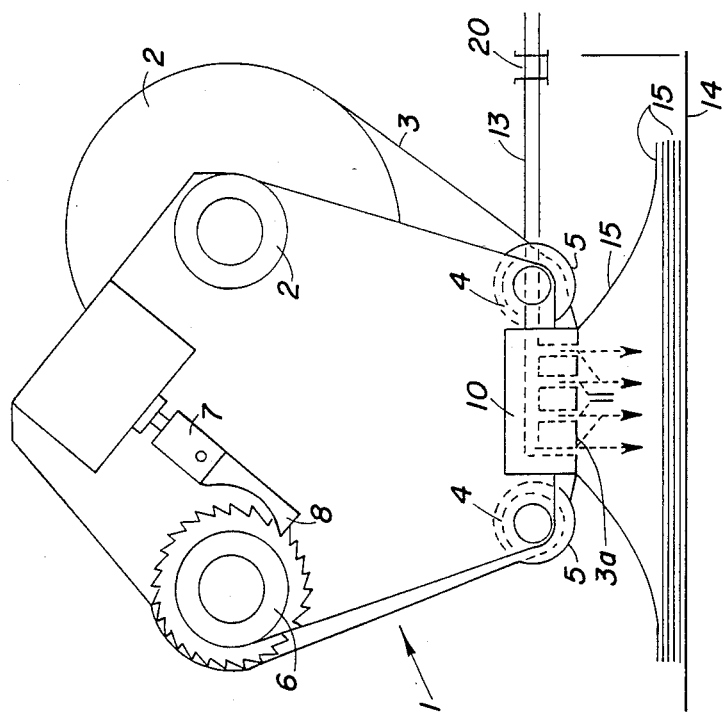
FIG. 5 is the front view of a holding device according to the invention, soon after the holding of a pantyhose garment; and, FIG. 6 shows the side view of the device of FIG. 5.

In the embodiment of FIG. 5 the holding device 1 with adhesive, includes, in operative order: a coil 2 on which a usual adhesive tape 3 is wound on one side only; of a spring 30 for the friction of coil 2 able to ensure the proper tension of the adhesive tape 3 during the holding; two tape-guiding rollers 4, within the groove of which the tape 3 passes and cannot come out therefrom owing to the presence of lateral edges 5 which project from the periphery of the rollers, a drum 6 for the rewinding of the used tape, the intermittent movement of which being obtained by means of a pneumatic device 7 provided with a pawl 8; a block 10 interposed between said tape-guiding rollers 4 to allow the horizontal support of the zone of tape 3 intended to provide the holding of the article.

A body 11 formed integral with block 10 and laterally displaced with respect to the holding zone 3a of the adhesive tape, is provided with a plurality of vertical nozzles 12 communicating with a common duct 13 for the supply of compressed air drawn from an external compressor.

A horizontal support 14, for a plurality of like articles 15, equally oriented in a predetermined position and in overlapping relationship to form a stack located below said holding device 1 with adhesive, and interlocked to a vertical alternate movement intermittently performed from and towards said holding device 1 after the holding of each article 15.

According to the invention, the number, disposition and inclination of the nozzles 12 with respect to the holding surface of article 15 may widely vary in relation to the type of yarn and stitch utilized for the article fabric.

The compressed air flows from said nozzle 12 soon after the holding of each article by the adhesive tape 3 and during at least a fraction of the next phase for the moving away of the article towards the support 14, it is understood that the flow of compressed air to the nozzles 12 is activated and respectively cut off, by a solenoid valve 20 inserted on the supply duct 13 and associated to a timer, whose intervention is synchronized with the movements of the articles holding device 1 and support 14.

The operation is as follows. The tape holding surface 3a is brought in contact, through a slight pressure, with the upper face of the tubular flat article 15 which is on top of the stack of articles present on the support 14, following the upwards displacement of same support 14; after which, as soon as the downwards movement of support 14 has begun and while the upper face of the tubular article 15 is retained by the holding zone 3a of the adhesive tape, the nozzles 12 flow out as many thin jets of compressed air which, by filtering through the stitches of the fabric, acts upon the lower face of the tubular article thereby causing the stretching out of the elastic edge.

It is understood that in place of the coil and the adhesive tape other systems may be utilized, such as a belt ring-mounted and with its external surface spread with liquid glue supplied through a fixed tank with the aperture turned downwards and a felt for the closing of the tank in contact with the belt; the tank may also be replaced by a block of stick glue or by a drop device with brush in contact with the belt.

Practically, the construction details may vary in whatever equivalent way as for the form, dimensions, elements, disposition, nature of materials employed are concerned, without nevertheless coming out from the scope of the solution idea adopted and, therefore, remaining within the limits of the protection granted by the present patent for industrial invention.

While specific embodiments of the invention have been shown and described in detail to illustrate the application of the principles of the invention, it will be understood that the invention may be embodied otherwise without departing from such principles.

What is claimed is:

1. Device for the temporary holding of articles of hosiery fabrics with permeable surfaces, especially tubular pantyhoses and stockings, comprising: a holding device with adhesive, including a tape-like adhesive element having a holding zone, two transmission and tension members, drive means for intermittently moving the adhesive elements forwards between the two transmission and tension members, a block for the support of the holding zone of the adhesive element and an underlying support for a plurality of the articles each equally oriented and overlapping to form a stack; means for providing at least a jet of compressed air acting in the vicinity of at least one of the edges of said holding zone of the tape, at an inclined direction with respect to the permeable holding surface of the articles and in an opposite direction with respect to that of the retention force of the adhesive tape, said means for providing at least a jet of compressed air including at least a body fixed to the support structure of the holding device with adhesive between the two transmission and tension elements of the tape, laterally to the holding zone of the tape, said body being provided with a plurality of nozzles communicating through a common duct with a supply of compressed air, the flow of compressed air being activated and respectively cut off, by means of a solenoid valve inserted on the supply duct and associated to a timer and whose intervention is synchronized with the holding device and the articles support, the jet of compressed air being generated after the holding of each one of the articles of the stack by the adhesive zone of the holding device and during at least a fraction of the phase for the withdrawal of the support with the articles from the holding device with adhesive so that the jet of compressed air passes through the permeable holding surface urging a next adjacent underlying article surface away from the holding surface thereby separating the surfaces.

2. Device according to claim 1, wherein the inclination axis of the nozzles with respect to the holding surface of the article is within 45 and 90 degrees, and preferably equal to 90 degrees.

3. Device according to claim 1, wherein said body is an integral part of the block of the holding devices.

4. Device according to claim 1, wherein the holding device is vertically movable to and from an underlying support for the articles to be picked up.

5. Device according to claim 1, wherein the support for the articles to be picked up is vertically movable to and from an overhanging holding device.

* * * * *